United States Patent
Heijnsdijk et al.

(10) Patent No.: US 9,482,564 B2
(45) Date of Patent: Nov. 1, 2016

(54) MAGNETIC-INDUCTIVE FLOW METER DEVICE HAVING A PLURALITY OF FLOWMETER UNITS, POWER SUPPLY AND EVALUATION UNITS PROVIDED IN A COMMON HOUSING

(71) Applicant: Krohne AG, Basel (CH)

(72) Inventors: Alexander Heijnsdijk, Papendrecht (NL); Joseph Neven, Mours St. Eusèbe (FR); Arnoud van Willigen, Capelle a/d (NL)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 14/423,225

(22) PCT Filed: Aug. 17, 2013

(86) PCT No.: PCT/EP2013/002478
§ 371 (c)(1),
(2) Date: Feb. 23, 2015

(87) PCT Pub. No.: WO2014/029485
PCT Pub. Date: Feb. 27, 2014

(65) Prior Publication Data
US 2015/0204702 A1    Jul. 23, 2015

(30) Foreign Application Priority Data
Aug. 21, 2012 (DE) .......... 10 2012 016 408

(51) Int. Cl.
*G01F 1/58* (2006.01)
*G01F 1/60* (2006.01)

(52) U.S. Cl.
CPC .............. *G01F 1/584* (2013.01); *G01F 1/586* (2013.01); *G01F 1/588* (2013.01); *G01F 1/60* (2013.01)

(58) Field of Classification Search
None
See application file for complete search history.

(56) References Cited

U.S. PATENT DOCUMENTS

| | | | |
|---|---|---|---|
| 2,893,243 A | 7/1959 | Hurley | |
| 3,610,040 A * | 10/1971 | Wada | G01F 1/586 73/861.12 |
| 3,710,622 A * | 1/1973 | Hammond | G01F 1/125 73/861.84 |
| 4,543,822 A * | 10/1985 | Sorrell | G01P 5/086 73/170.29 |
| 5,207,105 A | 5/1993 | Fukunaga et al. | |

(Continued)

FOREIGN PATENT DOCUMENTS

| | | |
|---|---|---|
| DE | 1162587 B | 2/1964 |
| DE | 8803594 U1 | 4/1988 |

(Continued)

*Primary Examiner* — Harshad R Patel
(74) *Attorney, Agent, or Firm* — Davis S. Safran

(57) ABSTRACT

A magnetic-inductive flowmeter, having a plurality of functional units and a housing common to all the functional units, wherein each functional unit has a measuring tube, a magnetic field generating device, and two measuring electrodes, and wherein a virtual connecting line of the two measuring electrodes extends at least substantially at right angles to the direction of the magnetic field penetrating the measuring tube at right angles to the longitudinal axis of the measuring tube. In the housing, there is a common medium feed connection for the measuring tubes of all the functional units, a common power supply for the magnetic field generating device of all the functional units, and a common evaluation unit for the measuring electrodes of all the functional units. The magnetic field generating device has a field coil adjoined on both sides by a magnetic field guide part extending at right angles to the coil axis.

18 Claims, 5 Drawing Sheets

(56) References Cited

U.S. PATENT DOCUMENTS

| | | | |
|---|---|---|---|
| 5,402,685 A | 4/1995 | Brobeil | |
| 5,503,026 A | 4/1996 | Boehm et al. | |
| 6,260,420 B1 * | 7/2001 | Ketelsen | G01F 1/584 73/861.12 |
| 6,453,756 B2 | 9/2002 | van Willigen | |
| 7,261,001 B2 | 8/2007 | Heijnsdijk et al. | |
| 7,293,469 B2 | 11/2007 | Yasumatsu | |
| 7,472,606 B2 * | 1/2009 | Seddon | G01F 1/8409 73/861.355 |
| 8,249,752 B2 | 8/2012 | Suzuki | |
| 8,286,502 B2 | 10/2012 | Pelayo | |
| 8,286,503 B2 | 10/2012 | Neuburger et al. | |
| 8,819,656 B2 | 8/2014 | Budmiger et al. | |
| 2004/0112595 A1 * | 6/2004 | Bostick, III | E21B 21/08 166/250.01 |
| 2004/0129424 A1 * | 7/2004 | Hosie | E21B 21/08 166/332.8 |
| 2010/0018305 A1 * | 1/2010 | Maute | E21B 47/10 73/152.29 |
| 2010/0180692 A1 * | 7/2010 | Reichart | G01F 1/58 73/861.11 |
| 2012/0037729 A1 | 2/2012 | Lee et al. | |
| 2013/0061685 A1 | 3/2013 | Brockhaus et al. | |
| 2015/0204703 A1 * | 7/2015 | Brockhaus | G01F 1/58 73/861.12 |

FOREIGN PATENT DOCUMENTS

| | | |
|---|---|---|
| DE | 4114537 A1 | 11/1992 |
| DE | 19535998 A1 | 4/1997 |
| DE | 197 08 857 A1 | 7/1998 |
| DE | 10 2004 014 295 A1 | 10/2005 |
| DE | 102007004826 A1 | 8/2008 |
| DE | 102008052649 A1 | 5/2010 |
| DE | 102009006733 A1 | 8/2010 |
| GB | 1283789 A | 8/1972 |
| GB | 2312512 A | 10/1997 |
| WO | 97/41407 A1 | 11/1997 |

* cited by examiner

MAGNETIC-INDUCTIVE FLOW METER DEVICE HAVING A PLURALITY OF FLOWMETER UNITS, POWER SUPPLY AND EVALUATION UNITS PROVIDED IN A COMMON HOUSING

BACKGROUND OF THE INVENTION

1. Field of the Invention

The invention relates to a magnetic-inductive flow meter, with a plurality of functional units and with a housing which is common to all functional units, each functional unit having at least one measuring tube for the through-flow of an electrically conductive medium, a magnetic field generating apparatus for generating a magnetic field which runs at least also perpendicular to the longitudinal axis of the measuring tube, and at least two measuring electrodes, and the virtual connecting line of the two measuring electrodes running at least essentially perpendicular to the direction of the magnetic field which is permeating the measuring tube perpendicular to the longitudinal axis of the measuring tube.

2. Description of Related Art

Magnetic-inductive flow meters have been widely known in the prior art for decades. Reference is made by way of example to the literature citation "Technische Durchflussmessung" [Technical Flow Rate Measurement] by Dr. Eng. K. W. Bonfig, 3rd edition, Vulkan-Verlag Essen, 2002, pp. 123 to 167 and also to the literature citation "Grundlagen Magnetisch-Induktive Durchflussmessung" [Principles of Magnetic-Inductive Flow Rate Measurement] by Cert. Eng. Friedrich Hoffmann, 3rd ed., 2003, publication of the company KROHNE Messtechnik GmbH & Co. KG.

The basic principle of a magnetic-inductive flow meter for measuring the flow rate of a flowing medium goes back to Michael Faraday who suggested as early as 1832 the use of the principle of electromagnetic induction for measuring the flow velocity of an electrically conductive medium.

According to the Faraday Induction Law, in a flowing, electrically conductive medium which is permeated by a magnetic field, an electrical field intensity arises perpendicular to the flow direction of the medium and perpendicular to the magnetic field. The Faraday Induction Law is used in magnetic-inductive flow meters in that, by means of a magnetic field generating apparatus which has at least one magnetic field coil, conventionally, two magnetic field coils, a magnetic field which changes over time during a measurement process is generated and the magnetic field at least partially permeates the electrically conductive medium which is flowing through a measuring tube. In doing so the generated magnetic field has at least one component perpendicular to the longitudinal axis of the measuring tube and perpendicular to the flow direction of the medium.

In the introduction, it is noted that each functional unit has a magnetic field generating apparatus for generating a magnetic field which runs at least also perpendicular to the longitudinal axis of the measuring tube or perpendicular to the flow direction of the medium, it is pointed out that, it is however sufficient that one component of the magnetic field runs perpendicular to the longitudinal axis of the measuring tube or perpendicular to the flow direction of the medium.

It was stated at the beginning that each functional unit includes at least two measuring electrodes, the virtual connecting line of the two measuring electrodes running at least essentially perpendicular to the direction of the magnetic field which is permeating the measuring tube. Preferably, the virtual connecting line of the two measuring electrodes, in fact, runs more or less perpendicular to the direction of the magnetic field which permeates the measuring tube.

The electrical field intensity which is produced by induction in the flowing, electrically conductive medium can be measured as an electrical voltage by measuring electrodes which are directly, therefore electrically in contact with the medium, or can also be capacitively detected by electrodes which are not directly, therefore not electrically in contact with the medium. The flow rate of the flowing medium through the measuring tube is derived from the measured voltage.

The measurement error in the magnetic-inductive flow meters which are known from the prior art is relatively small today; a measurement error less than 0.2% can be accomplished.

For the known magnetic-inductive flow meters reference is made by way of example to the German patent disclosure documents 197 08 857, 10 2004 063 617 (which corresponds to U.S. Pat. No. 7,261,001 B2), 10 2008 057 755 (which corresponds to U.S. Pat. No. 8,286,503 B2) and 10 2008 057 756 (which corresponds to U.S. Pat. No. 8,286,502 B2). The disclosures of these documents are hereby expressly incorporated by reference into this patent application.

In a host of applications, it is necessary to arrange and operate several magnetic-inductive flow meters adjacent to one another.

For the following considerations, if the first and second magnetic-inductive flow meters are adjacent, at least the magnetic field which has been generated by the magnetic field generating apparatus of the first flow meter at least partially permeates the measuring tube of the second flow meter. Of course, an adjacent arrangement is not limited to two flow meters.

Often it is not possible, for example, under limited conditions of space, to choose the spatial distance of magnetic-inductive flow meters to be so great that they are not adjacent. Shielding of the flow meters would be associated with additional costs and effort.

If the first flow meter and the second flow meter, in operation, are carrying out measurement processes, on the one hand, it is unknown whether the measurement processes of the two adjacent flow meters are overlapping in time, and on the other hand, in the case of time overlapping, how great the generally inconstant time overlapping is.

If time overlapping of the measurement processes of the two adjacent flow meters is assumed, in the measuring tube of the second flow meter, the magnetic field which has been generated by the magnetic field generating apparatus of the second flow meter and the magnetic field which has been generated by the magnetic field generating apparatus of the first flow meter and which extends to the measuring tube of the second flow meter are superimposed. The superposition of the two magnetic fields results in an induced electrical voltage which varies in an unknown manner and a corresponding influence on the flow rate measurements; this means a reduction of the measurement quality. Thus, for example, at a constant flow through the measuring tube of a flow meter, a varying flow rate can be displayed by the flow meter. Of course, the measurement process of the second flow meter also influences the measured value of the flow rate of the first flow meter.

U.S. Patent Application Publication 2013/0061685 A1 (which does not constitute prior art) relates to the problem of improving the measurement quality for adjacent magnetic-inductive flow meters and an improved arrangement of adjacent magnetic-inductive flow meters. This patent application teaches the synchronization of measurement processes of individual adjacent flow meters to prevent variations of mutual influences on the flow rate measurements by the magnetic fields of adjacent magnetic-inductive flow meters.

According to what was stated in the introduction, here it is not a matter of spatially separate, but adjacently located magnetic-inductive flow meters, but rather a magnetic-inductive flow meter with a plurality of functional units and with a housing which is common to all functional units. It is therefore a matter of several magnetic-inductive flow meters which are not spatially separated to the extent that they have a common housing. This flow meter is produced and marketed by the company Kirchgaesser Industrie Elektronik GmbH under the name "MULTIMIDEX".

SUMMARY OF THE INVENTION

The object of the invention is to devise a magnetic-inductive flow meter of the initially described type which has a relatively simple structure and which can be easily produced.

The object of the invention is, first of all, characterized essentially in that a common medium inflow connection or a common medium outflow connection is implemented in the housing for the measuring tubes of all functional units, and that a common power supply is implemented in the housing for the magnetic field generating apparatus of all functional units and/or that a common evaluation unit is implemented in the housing for the measuring electrodes of all functional units. For the object of the invention there are therefore first of all three approaches, specifically
   a) in the housing, the implementation of a common medium inflow connection or a common medium outflow connection for the measuring tubes of all functional units,
   b) in the housing, the implementation of a common power supply for the magnetic field generating apparatus of all functional units,
   c) in the housing, the implementation of a common evaluation unit for the measuring electrodes of all functional units.

The aforementioned three approaches can be alternatively or in part or in whole cumulatively implemented, therefore alternatively a) or b) or c), or cumulatively a) and b), a) and c), b) and c) or a) and b) and c).

Magnetic-inductive flow meters in accordance with the invention as explained above can be configured and developed in diverse ways; this applies especially to construction.

In magnetic-inductive flow meters of the initially described type and consequently also of the type in accordance with the invention, the magnetic field generating apparatus have a field coil. In conjunction with the latter, another approach is implemented in that, on both sides of the field coil, a magnetic field guidance part which is aligned perpendicular to the coil axis is connected. If the field coil, as is conventional, has a coil core of a material with good magnetic conductivity, it is recommended that care be taken in construction to join the magnetic field guidance parts to the coil core.

The latter described preferred embodiment of a magnetic-inductive flow meter can be improved by pole shoes being implemented. It then applies to this embodiment that the magnetic field guidance parts on their ends away from the field coil each have one pole shoe, the two pole shoes are aligned to one another and the measuring tube runs between the two pole shoes. Here, it is recommended that the diameter of the pole shoes be chosen to be greater than the diameter of the measuring tube; this has two advantages. On the one hand, in the plane perpendicular to the longitudinal axis of the measuring tube, therefore in the plane in which there are the measuring electrodes, the average magnetic induction is greater. On the other hand, the magnetic field in the longitudinal direction of the measuring tube has a greater extension.

An again improved and consequently preferred embodiment of a magnetic-inductive flow meter in accordance with the invention is characterized in that within a pole shoe there is a channel for penetration of a connecting line which leads to a measuring electrode. The connecting lines for the two measuring electrodes can be routed through such a channel. But, in each pole shoe a channel for the penetration of a connecting line which leads to a measuring electrode can be implemented. In any case, having the above explained channel or the channels run at an acute angle to the axis of the pole shoe is recommended.

In one preferred embodiment of a magnetic-inductive flow meter in accordance with the invention in which the magnetic field guidance parts on their end away from the field coils each have a pole shoe, it is recommended that the measuring tube be provided on either side with one pole shoe chamber which is assigned to the pole shoes. These pole shoe chambers make it possible during assembly of the magnetic-inductive flow meter in accordance with the invention to easily and correctly align the magnetic field guidance parts with the pole shoes provided thereon and after assembly the magnetic field guidance parts with the pole shoes provided thereon are correctly positioned and fixed with respect to the measuring tube. This can be further improved by the pole shoes and the pole shoe chambers having alignment and latching elements which correspond to one another.

Finally, it can be advantageous to provide a terminating disk assigned to the field coil at least on one side and to provide the terminating disk with a groove for guiding and fixing the connecting line which is assigned to the field coil.

In particular, there are various possibilities for embodying and developing the magnetic-inductive flow meter in accordance with the invention. In this respect reference is made to the exemplary embodiment which is shown only very schematically in the drawings and which is described below.

DETAILED DESCRIPTION OF THE INVENTION

Figure 1:
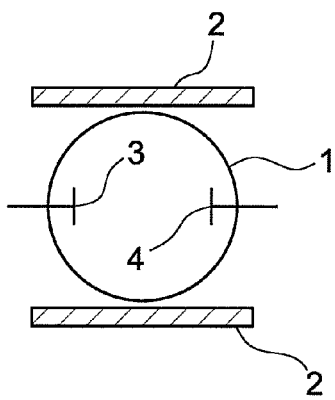
FIG. 1 shows very schematically the fundamental structure of a magnetic-inductive flow meter, FIG. 2 very schematically shows a magnetic-inductive flow meter with a plurality of functional units, FIG. 3 very schematically shows a first detail from a preferred embodiment of a magnetic-inductive flow meter in accordance with the invention.

The figures show a magnetic-inductive flow meter which includes fundamentally, as indicated in FIG. 1, a measuring tube 1 for the through-flow of an electrically conductive medium, a magnetic field generating apparatus 2 for generating a magnetic field which runs perpendicular to the longitudinal axis of the measuring tube 1 and at least two measuring electrodes 3, 4, the virtual connecting line of the two measuring electrodes 3, 4 running at least essentially perpendicular to the direction of the magnetic field which is permeating the measuring tube 1 perpendicular to the longitudinal axis of the measuring tube 1.

Figure 2:
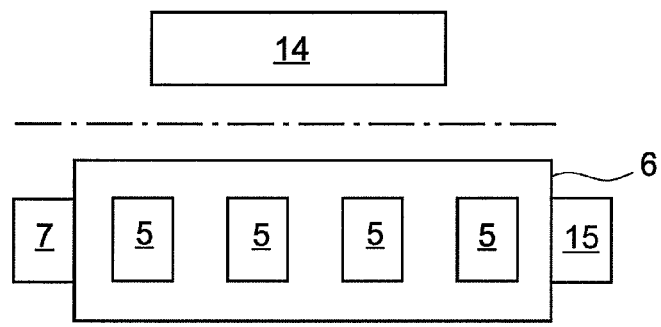

FIG. 2 suggests that the magnetic-inductive flow meter under consideration has a plurality of functional units 5 and a housing 6 which is common to all functional units 5, each functional unit 5 being made as was stated above in conjunction with FIG. 1 for the fundamental structure of magnetic-inductive flow meters.

Figure 3:
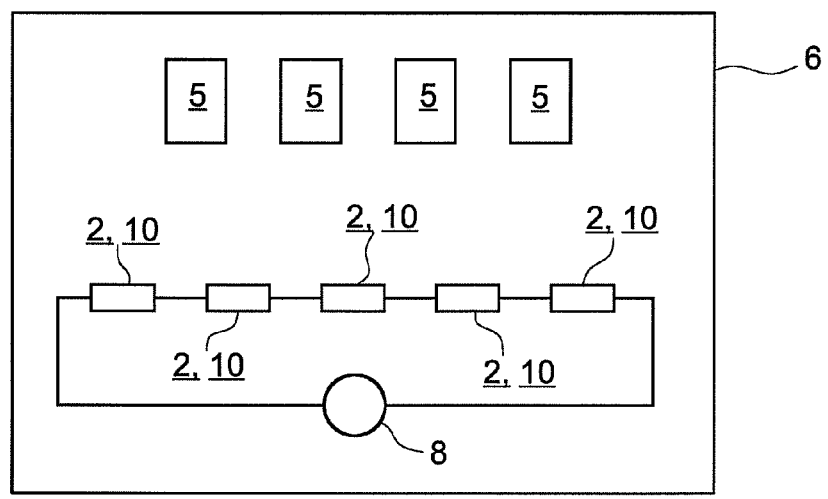

It is indicated in FIG. 2 that a common medium supply connection 7 is implemented in the housing 6 for the measuring tubes 1 of all functional units 5. Conversely, it is indicated in FIG. 3 that a common power supply 8 is implemented in the housing 6 for the magnetic field generating apparatus 2 of all functional units 5. Finally, it is indicated in FIG. 4 that a common evaluation unit 9 is implemented in the housing 6 for the measuring electrodes 3, 4 of all functional units 5.

The magnetic field generating apparatus 2 are also only schematically suggested in FIG. 1, which shows very schematically the fundamental structure of magnetic-inductive flow meters. Conversely, FIG. 3 shows that the magnetic field generating apparatus 2 of all functional units 5 have at least one field coil 10. It is easily recognizable that the field coils 10 of all functional units are connected in series.

It is not shown that the evaluation unit 9 is preferably made such that the electrode voltages which arise on the measuring electrodes 3, 4 of the individual functional units 5 are measured separately, but in parallel, i.e. in measurement phases which are the same for all functional units 5.

Figure 4:
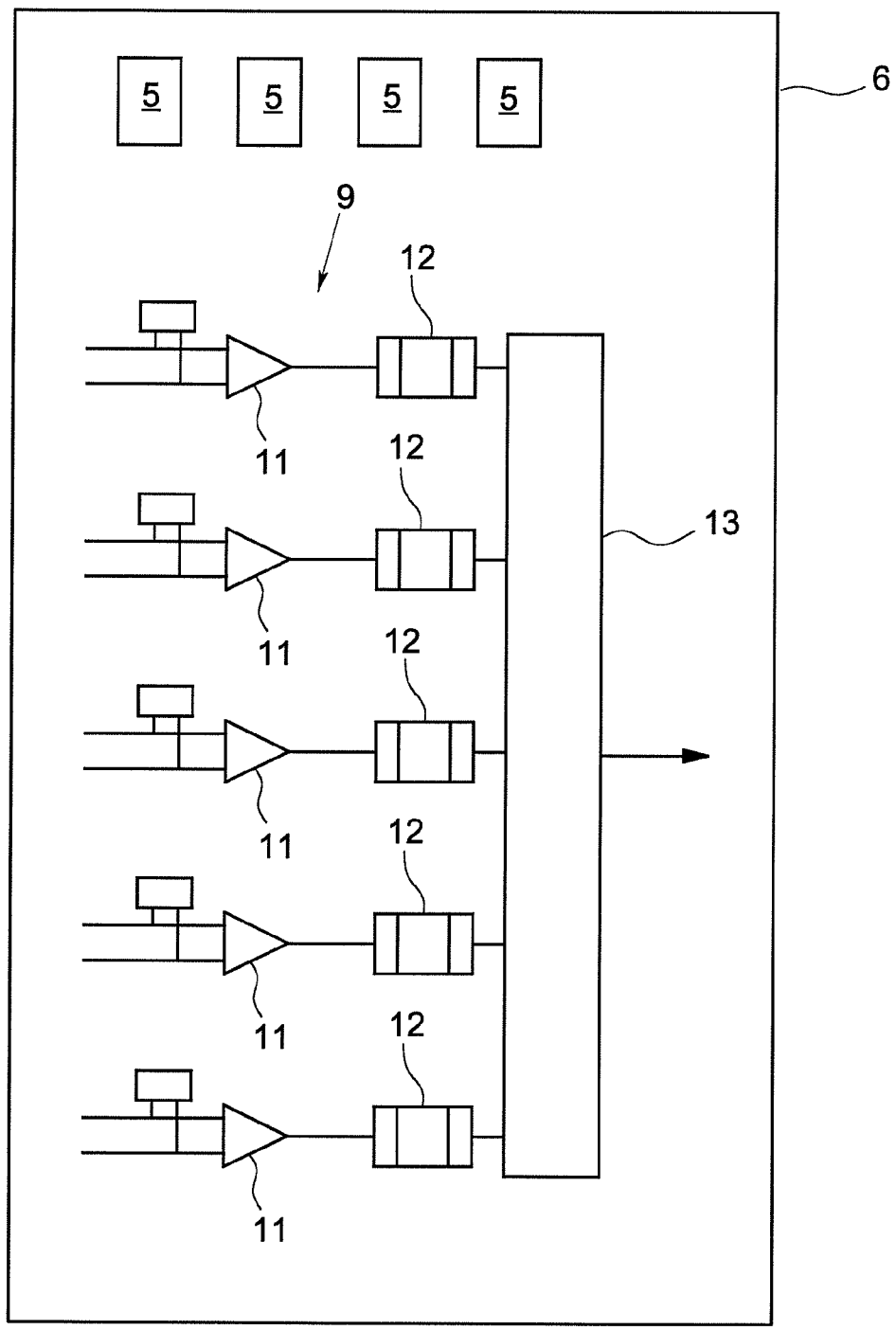
FIG. 4 is a very schematically representation of a second detail from a preferred embodiment of a magnetic-inductive flow meter in accordance with the invention.

FIG. 4 shows details relating to the evaluation unit 9 which is implemented jointly for the measuring electrodes 3, 4 of all functional units 5. In particular, first of all, the measuring each of electrodes 3, 4 of the individual functional units 5 includes its own preamplifier 11. Moreover, downstream of the measuring electrodes 3, 4 which belong to the individual functional units 5, each has its own A/D converter 12 connected to it. In particular, the A/D converters 12 are connected downstream of the preamplifiers 11. Finally, in FIG. 4, it is indicated that the evaluation unit 9 has an external digital bus interface 13.

Magnetic-inductive flow meters in accordance with the invention should preferably be able to be used in machines, for example, in cleaning machines in which water, in any case moisture, can arise, in any case in certain regions of these machines. In this respect, in the magnetic-inductive flow meters in accordance with the invention, the housing 6 is preferably implemented as an IP-66 housing, as an IP-67 housing or as an IP-68 housing (IP-#="Ingress Protection" ratings and are defined in international standard EN 60529; British standard BS EN 60529:1992, and European standard IEC 60509:1989 and define levels of sealing effectiveness of electrical enclosures against intrusion from, e.g., dirt, dust and moisture). In conjunction with this, or also instead of it, in the magnetic-inductive flow meters in accordance with the invention low voltage is used, therefore the connection to the line voltage, conventionally 230 V AC voltage is undertaken via a separate power pack 14, as indicated in FIG. 2.

Special configurations and developments of the magnetic-inductive flow meter which has been described so far are shown by FIGS. 5 to 9, specifically in conjunction with magnetic-inductive flow meters in which the magnetic field generating apparatus 2, as quite conventional, has one field coil 10.

Figure 5:
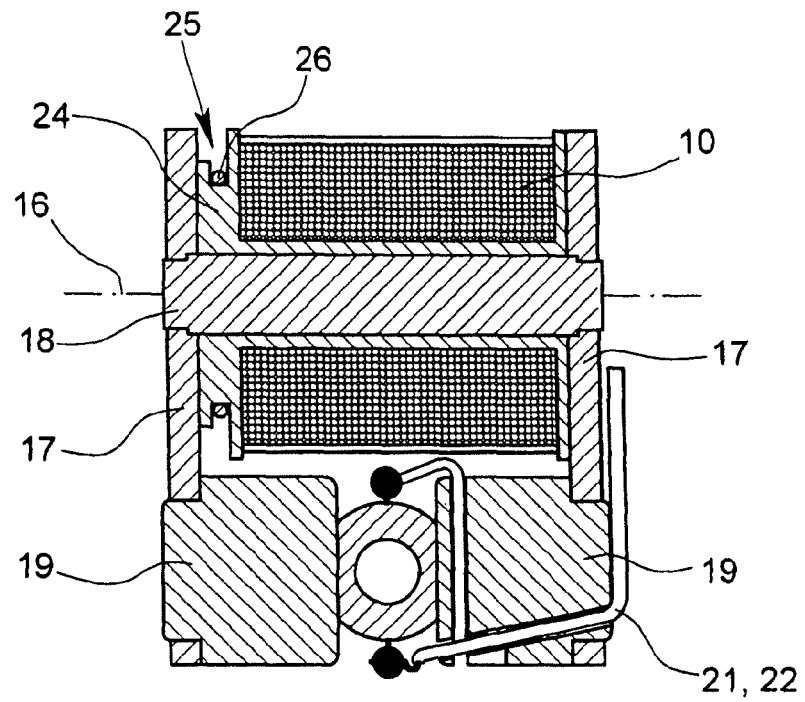
FIG. 5 shows a preferred embodiment of a magnetic field generating apparatus of a magnetic-inductive flow meter in accordance with the invention.

As FIG. 5 shows in particular, a magnetic field guidance part 17 which is aligned perpendicular to the coil axis 16 is connected to the field coil 10 on either side. As is also conventional, the field coil 10 has a coil core 18 of a material with good magnetic conductivity. Here, care is taken in construction of the magnetic field guidance parts 17 to be joined to the coil core 18.

It also applies to the preferred embodiment of a magnetic-inductive flow meter, as shown in FIG. 5, that pole shoes 19 are implemented. In particular, it applies that the magnetic field guidance parts 17 each have a pole shoe 19 on their ends away from the field coil 10, the two pole shoes 19 being aligned with respect to one another, and the measuring tube 1 running between the two pole shoes 19.

Moreover, it can be recognized in FIG. 5 that the diameter of the pole shoe 19 is greater than the diameter of the measuring tube 1. This yields two advantages. On the one hand, specifically in the plane perpendicular to the longitudinal axis of the measuring tube 1, therefore in the plane in which there the measuring electrodes 3, 4, are located, the average magnetic induction is greater. On the other hand, the magnetic field in the longitudinal direction of the measuring tube has a greater extension.

Figure 6:
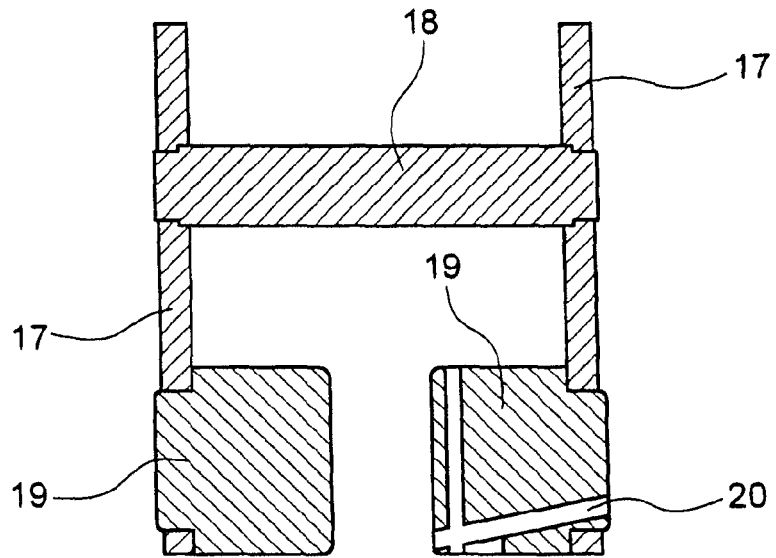
FIG. 6 shows the subject matter according to FIG. 5 without the field coil and measuring tube.

FIG. 6 shows the subject matter according to FIG. 5, but without the field coil 10 and without the measuring tube 1.

Figure 9:
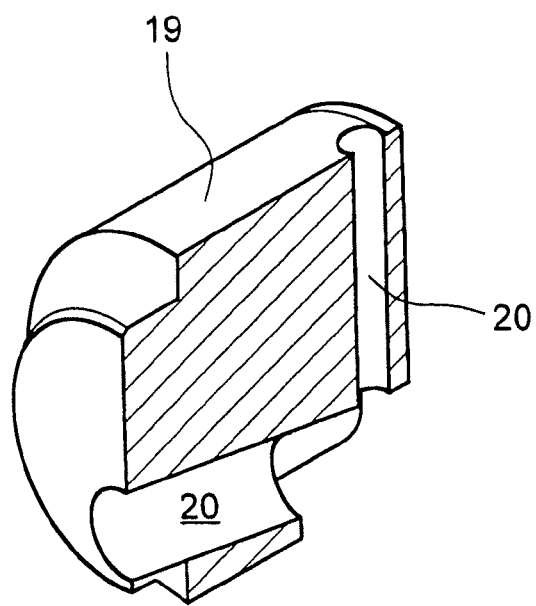
FIG. 9 is a sectional view of a special configuration of a pole shoe of a magnetic field generating apparatus of a magnetic-inductive flow meter in accordance with the invention.

As FIGS. 5 and 6 also show, but especially FIG. 9 shows, a channel 20 is implemented within each pole shoe 19 for the penetration of the connecting lines 21, 22 which lead to the measuring electrodes 3, 4. This channel 20 runs at an acute angle to the pole show axis (not shown).

Figure 7:
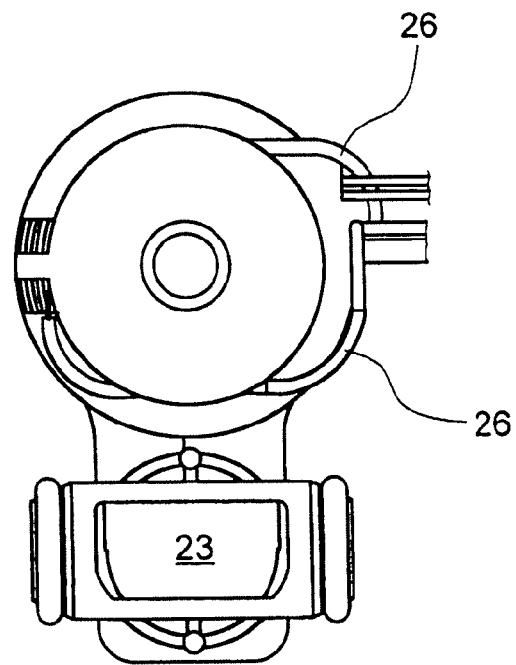
FIG. 7 is a side view of the subject matter according to FIG. 5, the front magnetic field guidance part being removed.

In the illustrated exemplary embodiment, as indicated in FIG. 7, the measuring tube 1 is provided with a pole shoe chamber 23 which is assigned to each of the pole shoes 19. It is not shown that the pole shoe 19 and pole shoe chambers 23 can have alignment and latching elements which correspond to one another.

Figure 8:
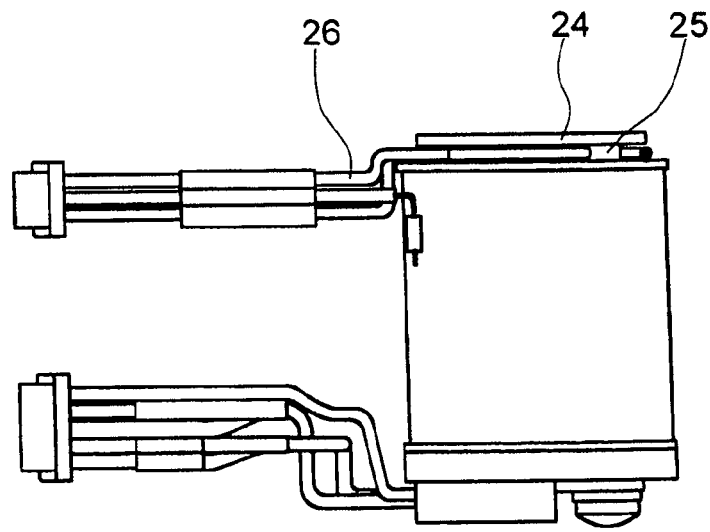
FIG. 8 is a top plan view of the subject matter according to FIG. 7.

Finally, it applies to the illustrated exemplary embodiment, which can be taken in particular from FIGS. 5, 7 and 8, that there is a terminating disk 24 on one side which is assigned to one of the field coils 10 and the terminating disk is provided with a groove 25 for guiding and fixing the connecting line 26 which is assigned to the field coil 10.

What is claimed is:
1. A magnetic-inductive flow meter, comprising:
a plurality of flowmeter units, each flowmeter unit having at least one measuring tube for a through-flow of an electrically conductive medium, a magnetic field generating apparatus for generating a magnetic field which runs at least also perpendicular to a longitudinal axis of the measuring tube, and at least two measuring electrodes, a virtual connecting line of the two measuring electrodes running at least essentially perpendicular to a direction of the magnetic field permeating the measuring tube perpendicular to the longitudinal axis of the measuring tube, and a housing which is common to all of the flowmeter units, wherein at least one of a common medium inflow connection and a common medium outflow connection for the measuring tubes of all of the flowmeter units is provided in the housing; and wherein an evaluation unit is provided that is adapted to measure the electrode voltages which arise on the measuring electrodes of the flowmeter units separately, but in parallel.

2. The magnetic-inductive flow meter as claimed in claim 1, wherein a common power supply for the magnetic field generating apparatus of all flowmeter units is provided in the housing.

3. The magnetic-inductive flow meter as claimed in claim 1, wherein a common evaluation unit for the measuring electrodes of all of the flowmeter units is provided in the housing.

4. The magnetic-inductive flow meter as claimed in claim 1, wherein the magnetic field generating apparatus has a field coil that is connected on each side to a magnetic field guidance part which runs perpendicular to a coil axis of the field coil.

5. The magnetic-inductive flow meter as claimed in claim 4, wherein the field coil has a coil core of a material having good magnetic conductivity and wherein the magnetic field guidance parts are connected to the coil core.

6. The magnetic-inductive flow meter as claimed in claim 4, wherein each of the magnetic field guidance parts has a pole shoe on each of the ends thereof that is located away from the field coil, the pole shoes being aligned relative to one another and wherein the measuring tube runs between the pole shoes.

7. The magnetic-inductive flow meter as claimed in claim 6, wherein pole shoes have a diameter that is greater than that of the measuring tube.

8. The magnetic-inductive flow meter as claimed in claim 6, wherein a channel for the penetration of a connecting line and which leads to a measuring electrode is provided within each pole shoe.

9. The magnetic-inductive flow meter as claimed in claim 8, wherein the channel runs at an acute angle to the axis of pole shoe.

10. The magnetic-inductive flow meter as claimed in claim 6, wherein the measuring tube is provided on each side with a pole shoe chamber which is assigned to a respective one of the pole shoes.

11. The magnetic-inductive flow meter as claimed in claim 10, wherein the pole shoes and the pole shoe chambers have alignment and latching elements which correspond to one another.

12. The magnetic-inductive flow meter as claimed in claim 4, wherein there is a terminating disk on at least one side of the field coil, and wherein the terminating disk is provided with a groove for guiding and fixing a connecting line to the field coil.

13. A magnetic-inductive flow meter, according to claim 1, wherein the magnetic field generating apparatus all flowmeter units have at least one field coil, the field coils of all functional units being connected in series.

14. A magnetic-inductive flow meter, comprising:

a plurality of flowmeter units, each flowmeter unit having at least one measuring tube for a through-flow of an electrically conductive medium, a magnetic field generating apparatus for generating a magnetic field which runs at least also perpendicular to a longitudinal axis of the measuring tube, and at least two measuring electrodes, a virtual connecting line of the two measuring electrodes running at least essentially perpendicular to a direction of the magnetic field permeating the measuring tube perpendicular to the longitudinal axis of the measuring tube, and a housing which is common to all of the flowmeter units, wherein a common power supply for the magnetic field generating apparatus of all flowmeter units is provided in the housing, and wherein a common evaluation unit for the measuring electrodes of all of the functional flowmeter units is provided in the housing, the evaluation unit being adapted to measure the electrode voltages which arise on the measuring electrodes of the flowmeter units separately, but in parallel.

15. A magnetic-inductive flow meter, according to claim 14, wherein at least one of a common medium inflow connection and a common medium outflow connection for the measuring tubes of all of the flowmeter units is provided in the housing.

16. A magnetic-inductive flow meter, comprising:

a plurality of flowmeter units, each flowmeter unit having at least one measuring tube for a through-flow of an electrically conductive medium, a magnetic field generating apparatus for generating a magnetic field which runs at least also perpendicular to a longitudinal axis of the measuring tube, and at least two measuring electrodes, a virtual connecting line of the two measuring electrodes running at least essentially perpendicular to a direction of the magnetic field permeating the measuring tube perpendicular to the longitudinal axis of the measuring tube, and a housing which is common to all of the flowmeter units, wherein a common power supply for the magnetic field generating apparatus of all flowmeter units is provided in the housing; and wherein an evaluation unit is provided that is adapted to measure the electrode voltages which arise on the measuring electrodes of the flowmeter units separately, but in parallel.

17. A magnetic-inductive flow meter, according to claim 16, wherein the magnetic field generating apparatus all flowmeter units have at least one field coil, the field coils of all functional units being connected in series.

18. A magnetic-inductive flow meter, comprising:

a plurality of flowmeter units, each flowmeter unit having at least one measuring tube for a through-flow of an electrically conductive medium, a magnetic field generating apparatus for generating a magnetic field which runs at least also perpendicular to a longitudinal axis of the measuring tube, and at least two measuring electrodes, a virtual connecting line of the two measuring electrodes running at least essentially perpendicular to a direction of the magnetic field permeating the measuring tube perpendicular to the longitudinal axis of the measuring tube, and a housing which is common to all of the flowmeter units, wherein a common evaluation unit for the measuring electrodes of all of the flowmeter units is provided in the housing, the evaluation unit being adapted to measure the electrode voltages which arise on the measuring electrodes of the flowmeter units separately, but in parallel.

* * * * *